Oct. 14, 1941.                F. J. YOUNG                 2,259,054
                             SLIP BUSHING
                       Filed March 22, 1940            3 Sheets-Sheet 1

Inventor
Forrest J. Young
By Lyon & Lyon
Attorneys

Oct. 14, 1941.　　　F. J. YOUNG　　　2,259,054
SLIP BUSHING
Filed March 22, 1940　　　3 Sheets-Sheet 2

Inventor
Forrest J. Young
By Lyon & Lyon
Attorneys

Oct. 14, 1941.   F. J. YOUNG   2,259,054
SLIP BUSHING
Filed March 22, 1940   3 Sheets-Sheet 3
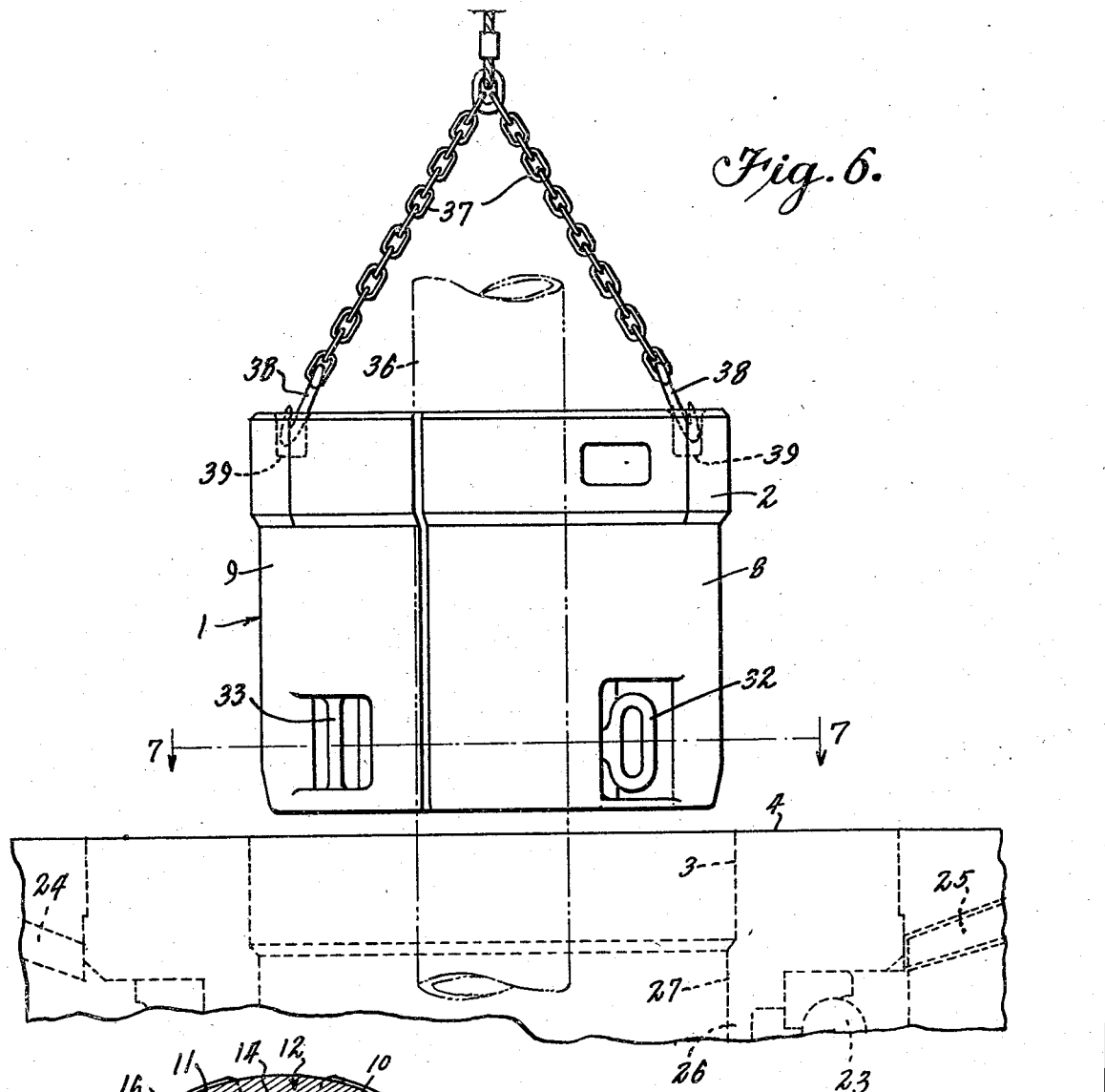
Fig. 6.
Fig. 7.
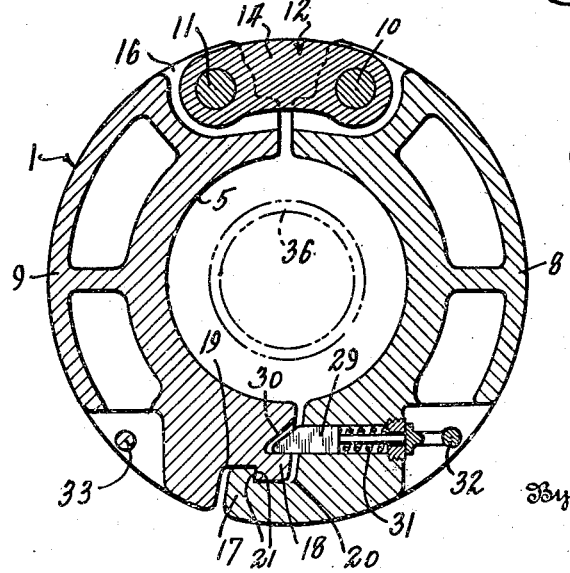
Inventor
Forrest J. Young
By Lyon & Lyon
Attorneys Patented Oct. 14, 1941

2,259,054

UNITED STATES PATENT OFFICE 2,259,054

SLIP BUSHING

Forrest J. Young, Los Angeles, Calif., assignor to The National Supply Company, Pittsburgh, Pa., a corporation of Pennsylvania Application March 22, 1940, Serial No. 325,371

11 Claims. (Cl. 24—263)

This invention relates to rotary drilling apparatus, and more particularly to means provided in such drilling apparatus for the gripping of the drill stem or pipe.

The principal object of this invention is to provide a device adapted to receive the gripping slips utilized for gripping the pipe during the drilling operations.

Another object of this invention is to provide a bushing adapted to receive pipe engaging slips and which bushing is composed of a plurality of pipe encircling segments which are readily separable to provide a side opening for lateral movement or passage of the pipe.

Another object of this invention is to provide a bushing which is composed of a pair of pipe-encircling segments which cooperate to form a slip-receiving seat and which segments are pivotally connected to a link at one end and are provided with interlocking means at their opposed ends.

Another object of this invention is to provide a bushing including a plurality of pipe-encircling segments providing a slip-receiving seat and having incorporated therein a latch means operative to prevent accidental disengagement of interlocking means formed between the slip segments.

Another object of this invention is to provide a bushing having a slip-receiving seat and which bushing is composed of a pair of pivotally connected segments which are normally maintained in position by pipe-engaging slips and which are separable by relative transverse movements in a direction radially of the pipe.

Other objects and advantages of this invention it is believed will be apparent from the following detailed description of a preferred embodiment thereof as illustrated in the accompanying drawings.

In the drawings:

Figure 6 is an elevation of the bushing embodying my invention illustrating the same as hoisted from the rotary table.

Figure 7 is a sectional view taken substantially on the line 7—7 of Figure 6.

Figure 1:
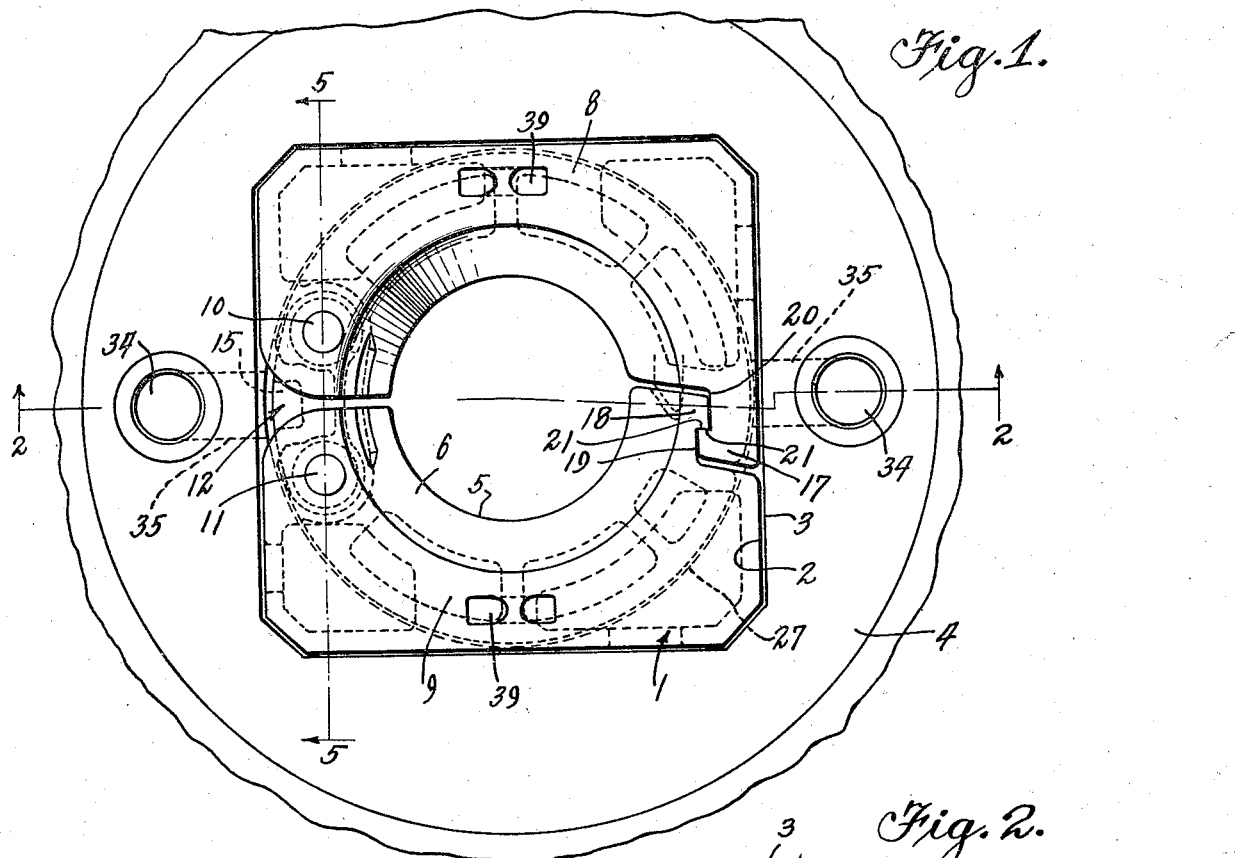
Figure 1 is a fragmental top plan view of a rotary table in the opening of which is positioned a bushing embodying my invention.
Figure 2:
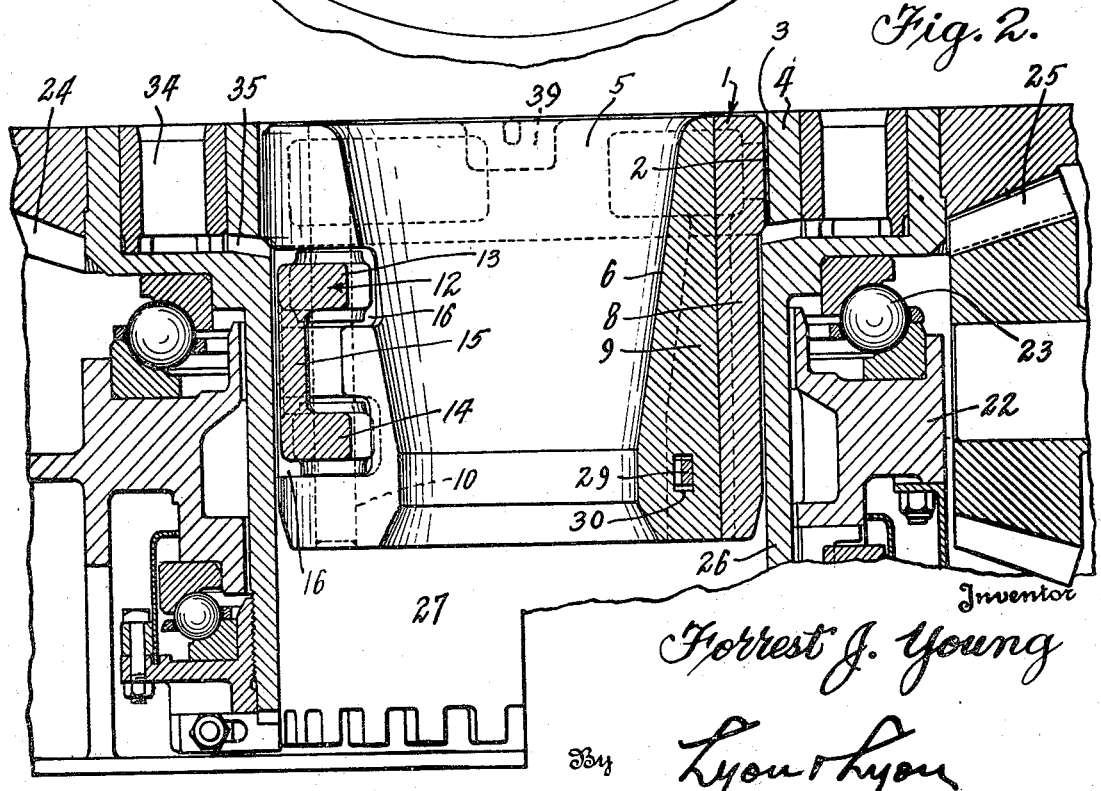
Figure 2 is a sectional view taken substantially on the line 2—2 of Figure 1.

In the preferred embodiment of my invention as illustrated in the accompanying drawings, 1 indicates a bushing having a polygonal section 2 adapted to be received in a correspondingly shaped opening 3 in the rotary table 4. The bushing is formed to provide a central bore 5 forming a tapered seat 6 for the reception of the pipe-engaging slips 7.

The bushing 1 as illustrated is formed of two complementary segments 8 and 9 hingedly connected at one end and formed to provide an interlocking connection at their opposite ends. The hinge connection provided between the segments 8 and 9 is such as to permit relative transverse movement of the said segments in order to permit engagement and disengagement of the interlocking connection. The hinge connection includes a pair of pivot pins 10 and 11 secured in position on the adjacent ends of the segments 8 and 9. A link 12 is pivotally mounted at its opposed ends on the pivot pins 10 and 11. The hinge link 12 is formed of a pair of horizontal arms 13 and 14 connected by a vertical bar 15. The hinge link 12 is supported upon the pins 10 and 11 within recesses 16 formed in the end portions of the segments 8 and 9 in order that the link member 12 may be substantially enclosed within the walls of the segments.

Figure 3:
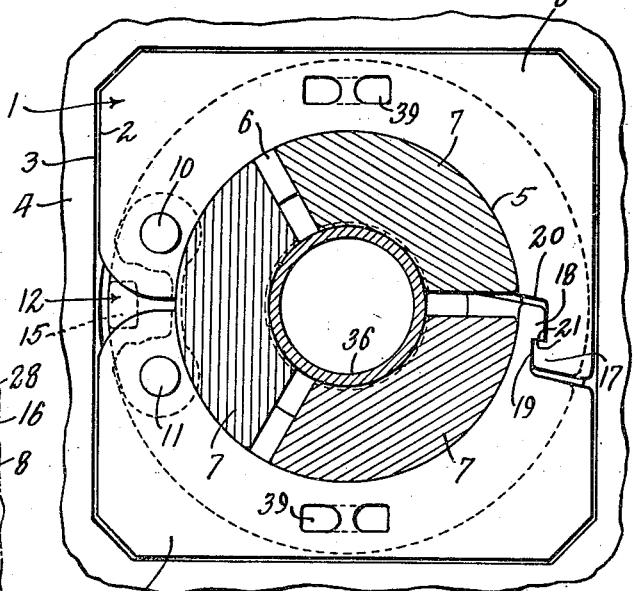
Figure 3 is a view similar to Figure 1 illustrating the pipe-engaging slips in position within the bushing.
Figure 5:
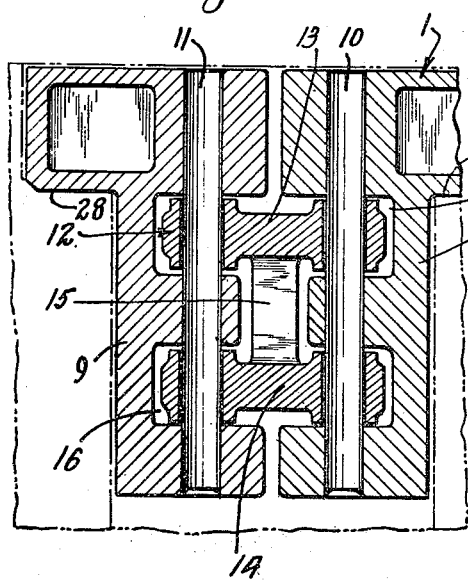
Figure 5 is a sectional fragmental elevation taken substantially on the line 5—5 of Figure 1.

At the opposite or free ends the interlocking connection is provided by a pair of complementary radially extending lugs 17 and 18 integrally formed on the segments 8 and 9 and adapted to fit within complementary recesses 19 and 20 formed adjacent each lug. When in the engaged position as illustrated in Figures 1 and 3, the free ends of the segments 8 and 9 are prevented from separating under the expansive force provided by the slips 7 acting to force the segments together at their mating faces 21.

It will be apparent from the foregoing that engagement of the lugs 17 and 18 can only be effected through relative sequential lateral and radial movements of the segments 8 and 9. Such movement is made possible by the double hinge construction of the pivot link 12.

As herein illustrated, the rotary machine may be of any suitable or desirable construction including a base 22 upon which the table 4 is rotatably supported upon bearings 23. A gear ring 24 is carried by the table 4 and is driven by the driving pinion 25. The table 4 is provided with a depending skirt 26 defining the central opening 27. The polygonal opening 3 in the table 4 terminates in a shoulder 28 to receive the lower portion of the polygonal section 2 of the bushing 1. The vertical alignment of the segments 8 and 9 is therefore maintained upon the shoulder 28.

The two halves of the bushing are first moved into closed position and are then lowered into the table 4. In operative position, the upper face of the bushing 1 lies practically flush with the top of the rotary table 4 and the two segments 8 and 9 of the bushing are confined within the central opening 27. In this position the lugs 18 and 19 can not become disengaged while the bushing 1 is in operative position within the table opening.

In order to maintain the bushing segments 8 and 9 against untimely displacement when the bushing 1 is withdrawn from the table opening as well as to supplement the confining action of the central opening 27 when the bushing 1 is in operative position, a latch mechanism may be provided for latching the interlocking connection. As illustrated, this latching mechanism includes a plunger 29 slidably mounted in a bore in one of the bushing segments and adapted to engage within a recess 30 formed in the other bushing segment. A spring 31 normally urges the plunger to the latching position and the handle 32 is provided for withdrawing the same from the latching position. A grip bar 33 is provided in a recess in the other segment.

To release the interlocking connection, the bushing 1 is removed from the rotary table and the operator grasps the grip bar 33 in one hand and the plunger handle 32 in the other hand. Releasing the latch plunger 29 and separation of the interlocking lugs may thus be accomplished by the operator, thereby effecting relative movement between the segments 8 and 9.

The bushing 1 remains in position in the central opening 27 of the table 4 during the drilling operation and a drill stem drive bushing of the type shown in the Wright Patent No. 1,347,771 is used during this drilling period and openings 34 are provided in the top of the table to receive the drive pins for such a bushing.

Drain passages 35 are provided to prevent the openings 34 from filling up with drilling mud. When the drilling operation is suspended and it is desired to withdraw the pipe 36 to change the bit or for any other reason, such drill stem drive bushing is removed and the pipe is withdrawn upwardly through the bushing 1. The slips are inserted onto the slip seat 6 to support the pipe as the pipe sections are uncoupled section by section.

Figure 4:
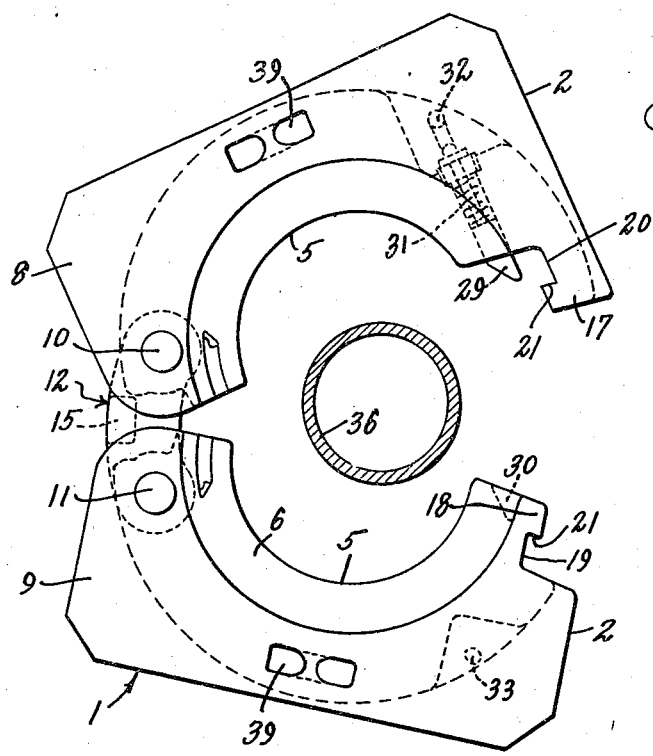
Figure 4 is a plan view of the bushing embodying my invention illustrating the same in open position for installation of, or withdrawal from, the pipe.

When the lowermost section of the pipe 36 reaches the surface, it can not be completely withdrawn through the bushing 1 because the bit which is attached to its lower end is generally too large to pass through the bore 5. The bushing 1 is lifted out of the rotary table as by means of chains 37 and hooks 38 which engage within recesses 39 provided in the upper surfaces of the segments 8 and 9. The operator may then separate the interlocking sections in the manner heretofore described and swings the bushing segments 8 and 9 to the position illustrated in Figure 4. The bushing 1 may then be withdrawn laterally from the pipe 36 and the pipe 36 and bit are then raised through the comparatively large opening 27 in the table 4.

To install the bushing 1 in place, the same operations are performed in the reverse order. The bit or reamer on the lowermost pipe section is first lowered through the opening 27 in the table 4. The bushing 1, supported by the chain 37, is then moved to open position and swung laterally in place around the pipe. The lugs 18 and 19 are interlocked by the operator and the latch plunger 29 automatically moves into the latch recess 30. The bushing 1 is then lowered as a unit into operative position within the opening in the rotary table 4. The slips 7 are then inserted onto the slip seats 6 and are operated in the usual manner to support the pipe 36 while additional lengths are coupled thereto.

Having fully described my invention, it is to be understood that I do not wish to be limited to the details herein set forth, but my invention is of the full scope of the appended claims.

I claim:

1. A device of the class described, comprising in combination a pair of complementary segments adapted to define a central opening to receive pipe engaging elements, a link member pivotally connected to each segment near one end so that their free ends may swing horizontally to and from a position to encircle a pipe, the axes of said pivotal connections being substantially equidistant from the axis of the pipe, and interengaging means formed integral with the free ends of said segments adapted to prevent separation of said segments when the pipe engaging elements are in operative position.

2. A device of the class described, comprising in combination a pair of cooperating segments adapted to define a tapered opening to receive pipe engaging slips, a link member pivotally connected to each segment near one end so that their free ends may swing horizontally to and from a position to encircle a vertical pipe, the axes of said pivotal connections being substantially equidistant from the axis of the pipe, connecting means near the free ends of said segments adapted to prevent separation thereof, said connecting means being engageable through relative horizontal movement of said segments in a direction substantially radial to the pipe.

3. A device of the class described, comprising in combination a pair of cooperating segments adapted to define a tapered opening to receive pipe engaging slips, a link member pivotally connected to each segment near one end so that their free ends may swing horizontally to and from a position to encircle a vertical pipe, connecting means near the free ends of said segments adapted to prevent separation thereof, said connecting means being engageable through relative transverse movement of said segments in a direction substantially radial to the pipe, and releasable latch means adapted to prevent such relative movement of the segments.

4. A device of the class described, comprising in combination a pair of substantially symmetrical segments cooperating to define a slip seat, a link member pivotally connected to each segment near one end so that their free ends may swing horizontally to and from a position to encircle a pipe, and interengaging means immovable on said segments near the free ends thereof adapted to prevent simultaneous and symmetrical pivotal movement of the segments relative to said link member.

5. A device of the class described, comprising in combination a plurality of pipe encircling segments adapted to define a slip seat to receive pipe engaging slips, said segments being hinged together for one segment to swing horizontally with relation to another, connecting means on the latter said segments adapted to prevent separation thereof, and a latch adapted to prevent release of said connecting means.

6. A device of the class described, comprising in combination a plurality of pipe encircling segments adapted to define a slip seat to receive pipe engaging slips, said segments being hinged together for the free end of one segment to swing horizontally with relation to the free end of another, and connecting means fixed on the latter said segments adapted to prevent separation of said free ends, said connecting means being engageable through relative sequential lateral and radial movement of the free ends of the segments.

7. A device of the class described, comprising in combination a pair of cooperating segments adapted to define a tapered opening to receive pipe engaging slips, a link member pivotally connected to each segment near one end so that their free ends may swing horizontally to and from a position to encircle a vertical pipe, connecting means near the free ends of said segments adapted to cooperate with said link to prevent separation of the segments under influence of expanding forces imparted by said slips, said means including a radially extending lug on one of the segments adapted to enter a corresponding recess on the other segment, the lug and recess being engageable through relative horizontal movement of said segments in a direction substantially radial to the pipe.

8. In a rotary table bushing, the combination of a plurality of bushing parts, forming a unitary bushing adapted exteriorly to fit a rotary table and interiorly to receive pipe engaging slips, said bushing parts including a pair of segments and a link member pivotally connected to each segment near one end, and connecting means near the other ends of the segments engageable through relative transverse movement of said segments.

9. A rotary table bushing, comprising in combination a pair of complementary rigid bushing segments forming a unitary bushing adapted exteriorly to fit a rotary table and interiorly to take pipe engaging slips, means at adjacent ends of the segments to connect said segments, said means including a hinged joint connecting one end of each segment, and means formed integrally with said segments adapted to provide a releasable hook connection positioned substantially diametrically opposite said hinge joint for connecting the other ends of the segments.

10. In a rotary table bushing, the combination of a plurality of pipe encircling segments forming a unitary bushing adapted exteriorly to fit a rotary table and interiorly to receive pipe engaging slips, said segments being hinged together for one segment to swing horizontally with relation to another, and connecting means formed integrally upon the latter said segments and adapted to secure them together against separation, said connecting means being maintained against disengagement by the walls of the rotary table within which the bushing is contained.

11. In a rotary table bushing, the combination of a pair of symmetrical pipe encircling segments forming a unitary bushing adapted exteriorly to fit a rotary table and interiorly to receive pipe engaging slips, said segments being connected together at one end for one segment to swing horizontally with relation to the other, interlocking means including lugs formed integrally on the free ends of said segments adapted to prevent separation thereof under influence of forces imparted by said slips, said lugs being engageable through relative transverse horizontal movement of said segments.

FORREST J. YOUNG.